March 1, 1949.  T. J. CHALFANT ET AL  2,462,844
IMPACT DAMPENER FOR AIRCRAFT LANDING GEARS
Filed March 17, 1945  2 Sheets-Sheet 1
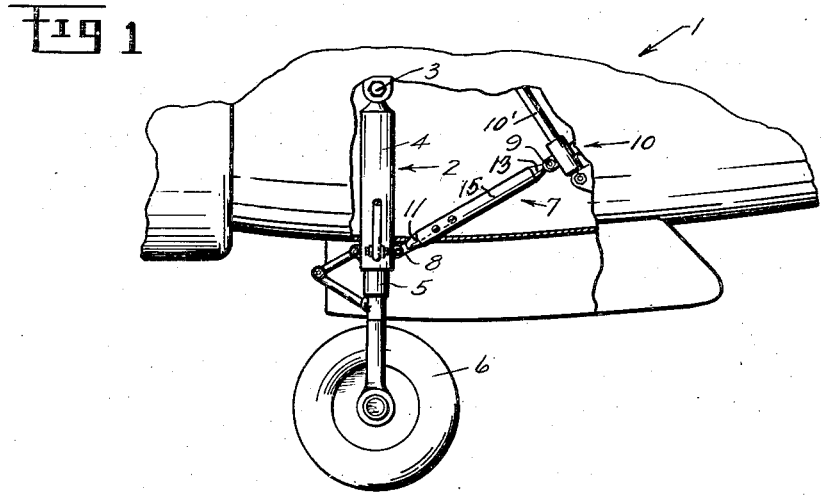
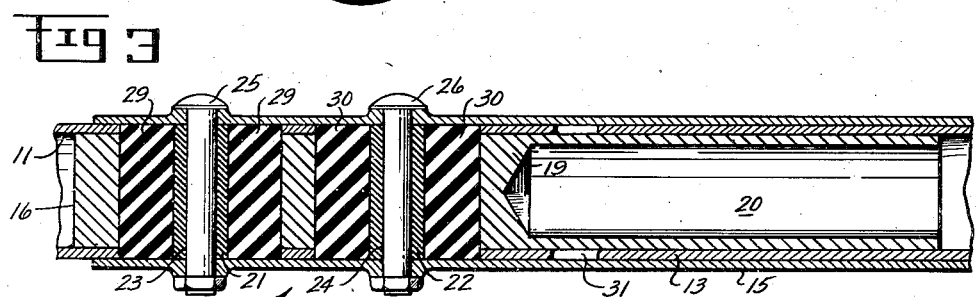
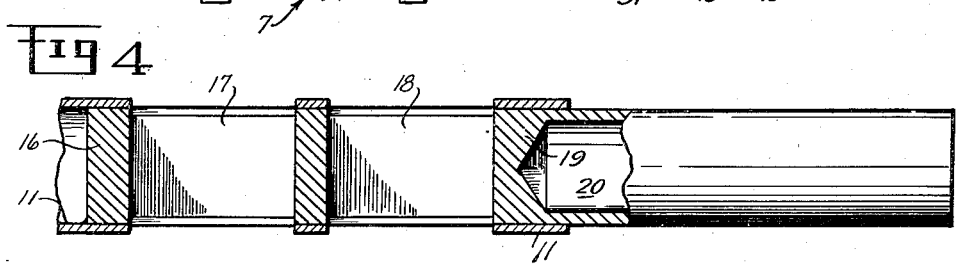
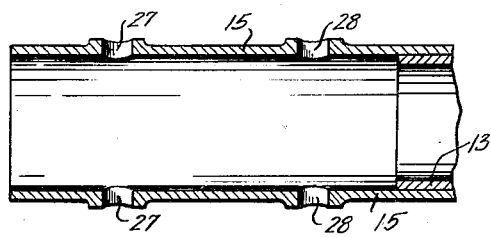
INVENTORS
THEODORE J. CHALFANT
GERALD W. HASCHKE
BY
ATTORNEYS March 1, 1949. T. J. CHALFANT ET AL 2,462,844
IMPACT DAMPENER FOR AIRCRAFT LANDING GEARS
Filed March 17, 1945 2 Sheets-Sheet 2
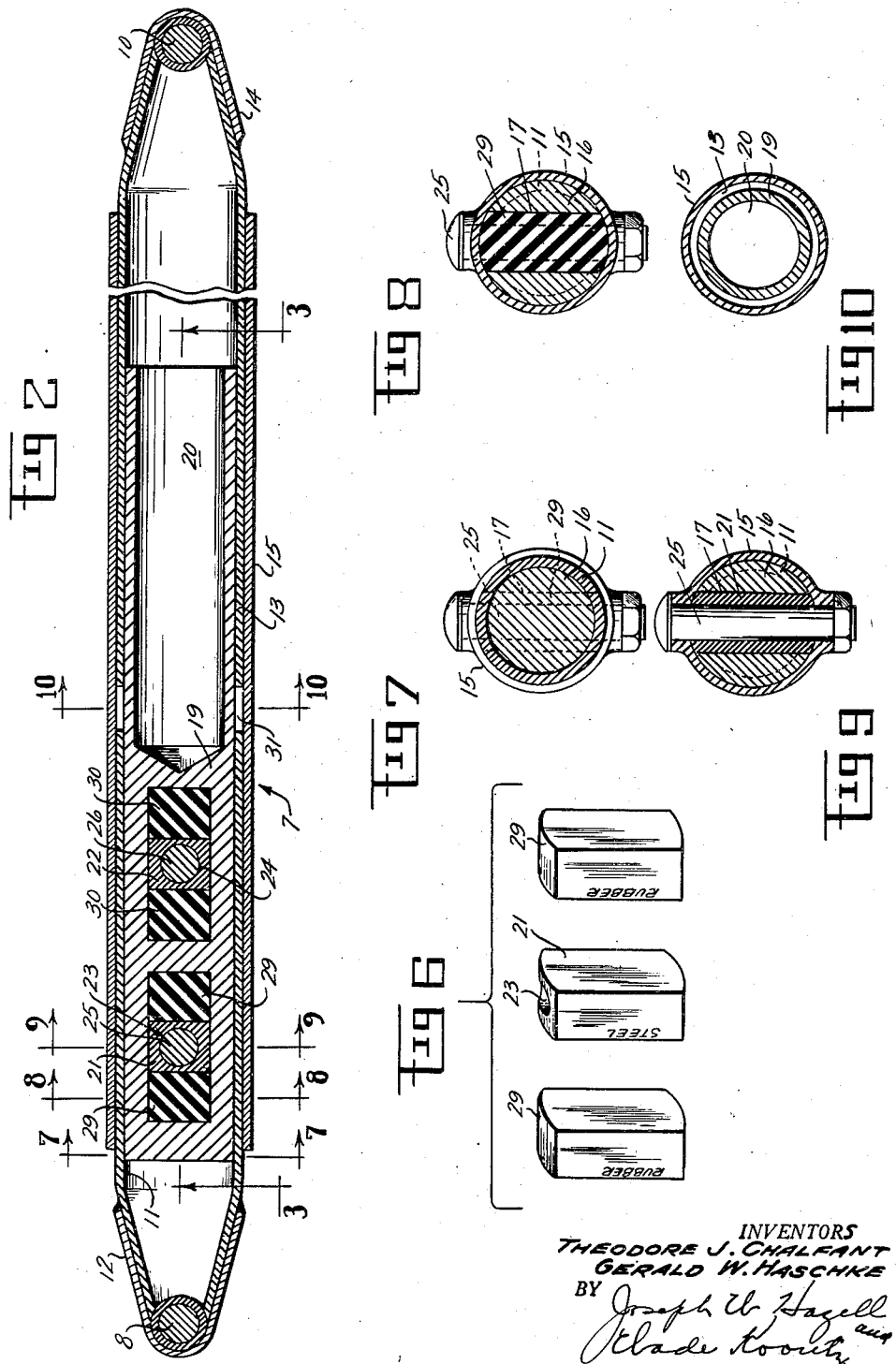
INVENTORS
THEODORE J. CHALFANT
GERALD W. HASCHKE
BY
ATTORNEYS Patented Mar. 1, 1949

2,462,844

UNITED STATES PATENT OFFICE 2,462,344

IMPACT DAMPENER FOR AIRCRAFT LANDING GEAR

Theodore J. Chalfant, New Carlisle, and Gerald W. Haschke, Dayton, Ohio

Application March 17, 1945, Serial No. 583,282

6 Claims. (Cl. 244—102)

(Granted under the act of March 3, 1883, as amended April 30, 1928; 370 O. G. 757)

The invention described herein may be manufactured and used by or for Government for governmental purposes, without the payment to us of any royalty thereon.

This invention relates to improvements in aircraft landing gear and more particularly to impact dampening means for aircraft cushioned landing gear.

In modern aircraft, particularly the relatively heavy high speed types employing folding or retractable landing gear, abnormally high fore and aft stresses are communicated to the shock struts, particularly the outer ends of the cushion struts at the instant when the landing gear initial contacts the surface on which the aircraft is landing.

The contact of the nonrotating landing wheels which are carried by the cushioned struts, with the landing surface, due to the fact that the landing wheels have considerable inertia or mass which must be overcome in order to accelerate the rotation of the wheels during the landing, so that the peripheral speed of the wheels equals the landing speed of the aircraft momentarily creates extremely high fore and aft bending stresses in the cushion struts.

Previously, a rigid fore and aft brace was employed to brace each of the cushioned landing struts against these fore and aft stresses, and attempts were made to design these struts sufficiently heavy or strong to take care of these momentary high stresses, making it necessary not only to design the brace and its landing gear connections and supporting structure for the landing gear, but even requiring that the strength of the wing structure be designed with a relatively high factor of safety in order to take care of these momentary fore and aft high stresses, requiring both the bracing structure and the wing supporting elements to be heavier and stronger than actually necessary, once the initial landing contact was made and the inertia of the landing wheels overcome so that the wheels are rotating in contact with the ground.

One serious difficulty that was present in this construction, although apparently designed with a good safety factor, was the tendency of crystallization of the material in the associated bracing and supporting structure of the retractable landing gear, due to the numerous sudden applications of these landing stresses during the many landings that occur during the life of the airplane. This crystallization often caused unexpected damage or breakage of the relatively overstrong drag link elements and associated supporting structures for the cushion landing struts during landing, causing collapse of the landing gear, and often loss or serious damage to the airplane and equipment, and injury or loss of life to the occupants of the aircraft.

An object of the present invention is therefore the provision of an improved retractable cushion landing gear construction which eliminates the aforesaid difficulties, permitting the use of relatively lighter fore and aft bracing means and associated elements, with the danger of crystallization of these structural materials reduced to a minimum.

A further object is the provision of semi-rigid bracing means having a predetermined degree of axial resiliency for absorbing relatively high fore and aft stresses between a cushion retractable aircraft landing gear and the supporting structure therefor, capable of absorbing the aforementioned fore and aft initial landing stresses resulting from the overcoming of the inertia of the landing wheels as they contact the landing surface and are accelerated to the landing speed of the aircraft.

A further object of the present invention is the provision of fore and aft bracing means for an aircraft retractable telescopic cushion shock strut landing gear having resilient means therein, capable of absorbing a predetermined amount of the relatively high fore and aft initial landing stresses when the landing wheels of the aircraft initially contact the ground.

Other objects and advantages of the invention will become apparent from the following description taken in connection with the accompanying drawings in which like reference characters refer to like parts in the several figures.

Fig. 1 is a side elevation of a portion of an aircraft structure illustrating a retractable landing gear having our improved cushion fore and aft bracing means incorporated therein.

Fig. 2 is an enlarged longitudinal vertical sectional view taken through the improved fore and aft landing gear brace or drag link member.

Fig. 3 is an enlarged fragmentary longitudinal sectional view of the construction shown in Fig. 2 and taken approximately on the plane indicated by the line 3—3 in Fig. 2.

Fig. 4 is a vertical longitudinal sectional view through the lower or inner element of our improved landing gear brace member with the lower or connecting end removed.

Fig. 5 is a fragmentary vertical longitudinal sectional view taken through the lower portion of the upper or outer element of our improved brace member.

Fig. 6 is a perspective view of one of the cushioning units for the brace member.

Figs. 7, 8, 9, and 10 are cross sectional views taken respectively on the planes indicated by lines 7—7, 8—8, 9—9, and 10—10 in Fig. 2 of the drawings.

Referring more particularly to Fig. 1 of the drawings, the reference numeral 1 indicates a portion of an aircraft structure, such as an engine nacelle or other supporting structure having a retractable landing gear mounted therein, the main cushion or oleo strut being indicated at 2, is hinged at 3 to swing rearwardly into the nacelle 1, comprises an upper element 4, pivoted at the fixed point 3, having telescopically slidable therein a lower or inner sleeve 5 cushioned in the conventional manner to absorb vertical landing stresses, carrying the landing wheel 6.

A fore and aft brace member or drag link member 7 is connected at its lower end, as indicated at 8, to the lower end of the upper barrel element 4 of the cushion or oleo shock strut 2. The opposite end of the brace member 7 is connected at 9 to the retracting slide of the retracting mechanism indicated generally at 10 movable on its mounting rod 10' so as to permit the cushion strut 2 and landing wheels to swing or fold into the motor nacelles in the conventional manner.

Since the landing gear, including the operating mechanism and main shock strut cushioning means may be of conventional construction, with the exception of the brace member 7, these elements are illustrated somewhat diagrammatically in the drawings.

The landing gear brace member 7 includes a lower tube or barrel member 11, reinforced at 12 at its lower end, to provide for the lower pivotal connection 8 previously referred to. An upper barrel member 13 is telescopically received over the lower barrel member 11, reinforced at 14, at its outer end to provide for the upper pivot or hinge connection with the slide member 10 previously referred to.

The upper barrel 13 carries an outer sleeve 15, telescoping the upper barrel 13 and the lower barrel 11. the sleeve 15 being rigidly secured on the upper barrel 13 by welding, or by other suitable fastening methods not shown.

The lower barrel member 11 carries a plunger member 16 fixed therein, extending in telescopic relation into the upper barrel member 13, as best illustrated in Fig. 3 of the drawings, the plunger 16 being firmly secured to the barrel 11 by welding, or other suitable fastening methods. The barrel member 11 and plunger member 16 have a plurality of axially spaced, elongated, rectangular-shaped openings 17, 18 formed therein, and is recessed at 19 to provide a sleeve-like guide extension 20, telescopically received within the upper barrel member 13, as illustrated in Fig. 3 of the drawings.

Rectangular elongated abutment posts or blocks 21, 22 are interposed in spaced relation between the opposite ends of the rectangular openings 17 and 18, the posts having central bores 23 and 24 extending longitudinally therethrough for the reception of securing bolts 25 and 26. The bolts 25 and 26 have their opposite end portions secured in the reinforced openings 27 and 28, formed in the opposite side portions of the outer sleeve member 15 which is fixed to outer barrel member 13, forming a part of the upper portion of the brace member 7. Two pairs of rectangular elongated cushion or shock absorbing or dampening members 29, 29 are provided, formed of suitable compact resilient material such as rubber, these cushion blocks 29, 29 being interposed between the opposite ends of the rectangular openings 17 and 18 in the plunger 16 and barrel 11 and the opposite faces of each abutment of the blocks or posts 21, 21. The cushion inserts or blocks 29 and 30 preferably fill the space between the rectangular openings 17 and 18, and between the opposite longitudinally disposed faces of the abutment post 21 and 22, the other or opposite sides of these posts 21 and 22 being preferably disposed in close sliding relation with respect to the side walls of the elongated rectangular openings 17 and 18.

When the resilient telescopic fore and aft bracing unit is assembled, the adjacent ends of the upper and lower barrel members 11 and 13 are disposed in longitudinally spaced end-to-end relation with respect to each other, this space being indicated at 31 in the drawings and sufficient to permit limited compression of the strut member without the ends of the barrels 11 and 13 contacting.

Normal engagement of the cushion members 29, 29 and 30, 30 between the ends of the rectangular openings 17 and 18, and the intermediate abutment posts 21 normally holds the pivot connections at the end of the brace, when connected to the oleo shock strut 2 and retractable landing gear elements 10, at a substantially fixed distance apart, the brace forming a longitudinally telescopic brace member having a limited amount of relatively high compressibility or longitudinal resiliency.

In the operation of the device, when installed on a high-speed aircraft that is landing, the inertia of the landing wheels that must be overcome in order to quickly accelerate the rotation of the wheels so that the peripheral speed of the tires is brought up to the landing speed of the aircraft, particularly when the landing wheels initially contact with the ground, is converted into a momentary very high stress in a rearward or fore and aft direction, tending to violently move the free end of the vertical cushion strut 2 rearwardly. As the acceleration of the wheels occurs very rapidly, this initial, excessive high, fore and aft stress drops off almost immediately, but during the application of the initial high thrust, the lower end of the cushion strut 2 is moved rearwardly through a small arc applying compression stresses to the lower end of the link member 7. The lower barrel element 11 of the link member 7 resiliently yields axially with respect to the upper barrel element 13, the abutment blocks or posts 21 and 22 compressing the rubber cushions 29 and 30 which are disposed between the abutment posts 21 and 22, and the lower ends of the openings 17 and 18. The high stresses initially communicated to the vibration absorbing brace member first compress the cushion members 29, 29 and 30, 30. The resilient cushion members then immediately expand as the high stresses are absorbed by the cushion members, and the inertia of the landing wheels is being overcome as they are rotated, this rebound action may occur rather violently, tending to move the lower barrel portion 11 outwardly. The abutment posts 21 and 22 compress the other set of cushion blocks 29 and 30 against the opposite ends of the recesses 17 and 18, thus absorbing the rebound shock on the brace member and its associated retractable gear supporting connections.

As before pointed out, our improved aircraft retractable landing gear bracing strut has a very high degree of resistance to compression and tension, and only yielding to a predetermined relatively small degree, due to the very high initial stresses which occur on the initial landing contact, during the time interval between when the landing wheels contact the ground and the inertia of the wheels is overcome as they are accelerated up to substantially ground speed. After the initial landing contact and fore and aft excessive stresses have been absorbed, the cushion brace acts as a substantially rigid vibration absorbing brace member. The brace unit does not absorb any appreciable amount of the vertical landing stresses since the main cushion or oleo strut takes care of these stresses, the fore and aft brace members primarily taking care of the extremely high momentary fore and aft stresses, tending to move the lower end of the main cushion strut rearwardly due to the contact of the non-rotating landing wheels with the ground.

While we have described our invention in detail in conjunction with a preferred embodiment, it will be obvious to those skilled in the art that various changes and modifications may be made therein without departing from the spirit of the invention as defined by the appended claims.

We claim:

1. A fore and aft landing stress absorbing brace member for retractable aircraft landing gear comprising a pair of aligned rigid barrel members disposed in spaced end to end relation, one of said barrel members having connecting means at its outer end for connecting the same to an aircraft landing gear supporting structure retracting means, and the other of said barrel members having connecting means at its outer end for connecting the same to a rearwardly retractable vertical shock receiving shock strut of the aircraft landing gear, an outer rigid sleeve rigidly secured exteriorly to one of the barrel members and extending exteriorly in guiding and telescopic relation to the other barrel member, an inner rigid cylindrical guide member rigidly secured within the last-mentioned barrel member and extending in telescopic guiding relation into the sleeve-carrying barrel member, said cylindrical guide member and its supporting barrel member having an elongated rectangular opening extending transversely therethrough with axially spaced abutment walls, rigid abutment means rigidly carried by said outer sleeve and extending into said elongated rectangular opening intermediate the abutment walls thereof, and resiliently compressible rectangular cushion members extending transversely across said outer sleeve intermediate said abutment means and each of said spaced abutment walls for maintaining the opposite connected ends of said barrel members substantially equidistant at all times and absorbing excessive fore and aft landing stresses communicated to said shock strut by landing contact thereof with a landing surface.

2. In combination with an aircraft having a vertically yieldable landing gear shock strut, a fore and aft resiliently yieldable brace connected at its opposite ends to said aircraft and said shock strut for absorbing excessive fore and aft landing stresses on the landing gear shock strut during initial landing contact of the aircraft with a landing surface comprising a pair of axially aligned telescopic members adapted to be connected at their opposite ends respectively to the aircraft, and to its landing gear shock strut, at spaced points in a substantially vertical plane in the direction of flight of the aircraft, a rectangular abutment member carried by one of the telescopic members and extending transversely through elongated rectangular guide openings formed in the wall of the other telescopic member with its opposite sides disposed transverse to the longitudinal axis of the brace and spaced from the ends of the rectangular guide openings, and rectangular resilient cushion blocks interposed between said rectangular abutment member and the last-mentioned ends of the rectangular guide openings in the telescopic member in contacting relation therewith for yieldably limiting relative axial movement between the telescopic members in opposite directions.

3. An elongated fore and aft landing stress absorbing telescopic cushion brace member for wheeled aircraft landing gear for absorbing initial fore and aft landing stresses in the direction of flight during landing between an aircraft landing surface and the aircraft landing gear while the inertia of the landing wheels thereof is overcome and during the acceleration thereof by the contact of the periphery of the landing wheels with the landing surface, connecting means at the opposite ends of said brace member for connection respectively with the landing gear of an aircraft and the aircraft landing gear supporting structure, said brace member comprising a pair of axially aligned inner and outer telescopic members, said inner telescopic member having a plurality of elongated longitudinally disposed rectangular openings formed therein each opening having axially spaced abutment end walls, bolt members passing transversely through the outer telescopic member and through the elongated rectangular openings in the inner telescopic member intermediate the abutment end walls of the openings and secured against movement in the walls of the outer telescopic member, elongated rectangular-shaped rigid abutment block members carried on said bolts and extending transversely across said telescopic members having spaced parallel side walls disposed in juxtaposed sliding contact with the longitudinal side walls of the elongated rectangular openings in the inner telescopic member, each of said elongated rectangular abutment blocks having their other parallel side walls disposed in axially spaced relation between the opposite abutment end walls of each of the elongated recesses, and a resilient cushion block member confined between the opposite inner walls of the outer telescopic member and between each of the abutment walls of each of the rectangular recesses and the axially-spaced parallel side walls of each of the rigid abutment block members.

4. In an aircraft landing gear, a support adapted to be carried by an aircraft, a vertically yieldable rearwardly retractable telescopic landing strut pivotally secured to said support at its upper end and comprising upper and lower telescopic members with landing means secured to the lower end of said lower telescopic member for landing contact with a landing surface, landing gear retracting means shiftably carried by said support for rearward and forward movements respectively on the support to landing gear retracting and landing positions, an elongated resiliently cushioned telescopic brace member connected at one end to said landing gear retracting means and at the other end to the lower end of the upper telescopic element of the landing strut, said brace member comprising axially aligned telescopic elements and resilient cushioning means disposed between the telescopic elements of the brace means for resiliently resisting relative movement between the telescopic elements of the brace member to resiliently cushion and resist relative rearward and forward movements of said upper shock strut telescopic member caused by the initial landing contact of the lower shock strut telescopic member landing means with a landing surface.

5. In combination with an aircraft having a landing gear thereon including a vertically disposed telescopic cushion landing strut comprising upper and lower aligned telescopic members with the upper telescopic member connected to the aircraft at one end to yield rearwardly in a substantially fore and aft vertical plane during initial landing contact of the aircraft with a landing surface, said lower telescopic member being yieldable vertically for absorbing vertical landing stresses during the landing of the aircraft; an elongated resiliently yieldable telescopic brace member connected at one end in said vertical plane to the aircraft and at the other end in said vertical plane to the other end of said upper telescopic member of the landing strut, resilient cushioning means disposed between the opposite connected ends of the telescopic brace member for resiliently cushioning relative telescopic movement between the ends of the brace member to absorb initial high fore and aft landing stresses applied to the landing strut through the lower end of the lower telescopic member of the landing strut incident to the initial landing contact thereof with a landing surface during the landing of the aircraft.

6. In combination with an aircraft having a retractable landing gear including a supporting structure carried by the aircraft having landing gear retracting means thereon and a cushion landing strut connected to the support for movement in a substantially fore and aft vertical plane between landing and retracting positions, said strut having a vertical yieldably lower telescopic portion with a landing wheel at its lower end for landing contact with a landing surface during the landing of the aircraft; elongated telescopic brace means extending in said substantially fore and aft vertical plane and connected at its upper end with the landing gear retracting means and at its lower with said cushion landing strut at a point above said lower vertically yieldable telescopic portion, resilient cushioning means between the telescopic portions of said telescopic brace means for resiliently cushioning initial fore and aft landing and recoil stresses applied to the lower end of said brace member by said landing wheel through said lower telescopic portion of the landing strut during the initial landing contact of said landing wheel with a landing surface incident to overcoming the inertia of the landing wheels during rotative acceleration thereof by said landing surface.

THEODORE J. CHALFANT.
GERALD W. HASCHKE.

REFERENCES CITED

The following references are of record in the file of this patent:

UNITED STATES PATENTS

| Number | Name | Date |
|---|---|---|
| 1,544,032 | Potez | June 30, 1925 |
| 1,786,718 | Moore | Dec. 30, 1930 |
| 1,864,134 | Harris | June 21, 1932 |
| 1,881,777 | MacPherson | Oct. 11, 1932 |
| 1,919,524 | Minshall | July 25, 1933 |

FOREIGN PATENTS

| Number | Country | Date |
|---|---|---|
| 447,610 | Great Britain | May 18, 1936 |